UNITED STATES PATENT OFFICE.

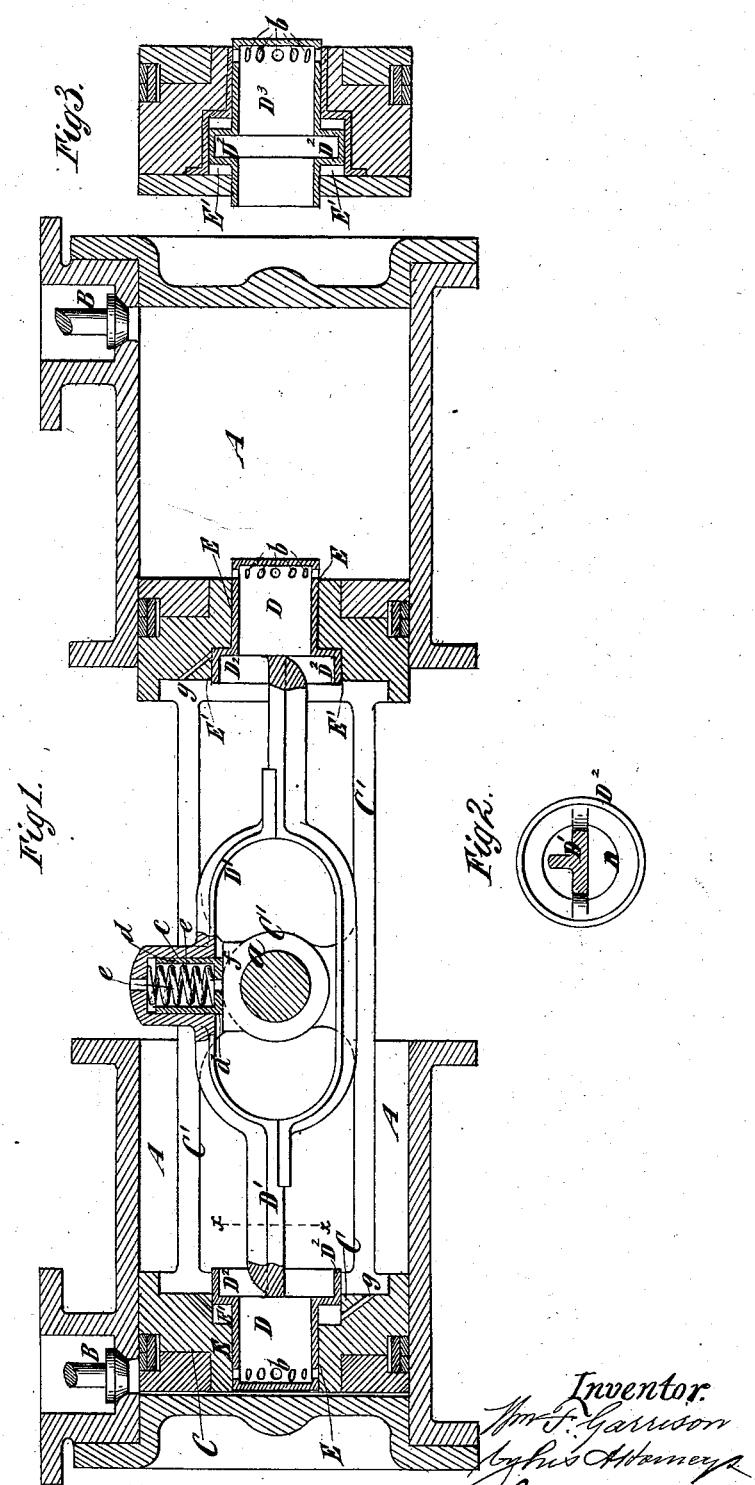

WILLIAM F. GARRISON, OF BROOKLYN, NEW YORK, ASSIGNOR TO GUILD & GARRISON, OF SAME PLACE.

VALVE FOR PUMPS.

SPECIFICATION forming part of Letters Patent No. 247,901, dated October 4, 1881.

Application filed June 8, 1881. (No model.) Patented in England September 18, 1878.

*To all whom it may concern:*

Be it known that I, WILLIAM F. GARRISON, of the city of Brooklyn, in the county of Kings and State of New York, have invented certain new and useful Improvements in Valves for Pumps, of which the following is a specification.

My invention relates, generally, to valves of pumps for air, gas, or liquid, and it is specially applicable to air-compressors.

The invention consists in the combination, in a pump, of a cylindric valve for controlling the passage of air or other fluid to or from the same, and having an annular enlargement formed integral with it, and a cylindric valve-seat, in which said valve fits, and which has an annular enlargement formed integral with it and receiving the annular enlargement of said valve, the annular enlargements of the valve and valve-seat together forming a dash-pot for arresting the movement of the valve in closing, as hereinafter described.

The invention also consists in the combination, in a pump, of two single-acting cylinders arranged in line, two connected pistons working therein, inlet or suction valves of the kind above described fitted in said pistons, and a yoke or connection between said valves. The dash-pot formed by each valve-seat and valve then serves to cushion both valves in their simultaneous movements.

The invention also consists in a novel means of supporting the weights of the two valves and yoke or connection between them, so as to prevent side wear of the valves and seats.

In the accompanying drawings, Figure 1 represents a central longitudinal section of a compressor embodying my invention. Fig. 2 represents a transverse section of the yoke or connection on the dotted line *x x*, Fig. 1, and a view of the outer end of the inlet-valve; and Fig. 3 represents a section of a piston and inlet-valve for a compressor having only one single-acting cylinder and piston.

Similar letters of reference designate corresponding parts in both figures.

A designates two single cylinders closed only at their outer ends and connected together or to a common frame or bed in any suitable manner. Each cylinder is provided at its outer end with an outlet or discharge valve, B.

C designates two pistons fitting in the cylinders A, provided with any suitable packing and connected by a trunk, C', so as to work simultaneously, one making its working stroke while the other is making its return-stroke. In the trunk C' is a cross-head, *a*, to which rods or other devices may be connected for working the pistons by means of a steam-engine or other means for producing motive power.

D designates inlet or suction valves, shown as of cylindric form, which are closed at their outer ends, and are connected by a yoke or connection, D', which is constructed so as to embrace the cross-head *a*, and causes the valves D to work simultaneously, one closing as the other is opening.

The valves D work in seats E of cylindric form in the pistons C, and near the closed outer end of each valve is an annular series or line of holes, *b*, which are closed by being covered by the valve-seat E, when one or the other of the valves is moved inward relatively to the piston containing it. In Fig. 1 the valve D of the left-hand piston C has its holes *b* covered by the seat, and is therefore closed, while the valve of the right-hand piston has its holes uncovered by the seat, and is therefore open. In the drawings the pistons are represented as just about commencing their stroke toward the right and the pressure generated in the air contained in the right-hand cylinder, and the suction in the left-hand cylinder produced by the movement of the pistons toward the right will cause the two valves D to be shifted toward the left, closing the valve of the right-hand piston and opening the valve of the left-hand piston.

The weight of the two valves D, and more especially the weight of the yoke or connection D', would produce side wear of the valves and their seats E, and to prevent this I form a socket, *c*, in the upper side of the yoke D', in which is fitted a saddle or plunger, *d*, which is impelled downward by a spring, *e*, and lean upon a seat, *f*, on the upper side of the cross-head *a*. The weight of the valves and yoke or connection is then, through the spring *e*, supported on the seat *f*. At the end of each valve-seat E, in the inner side of each piston C, is formed an annular enlargement or recess, E', and each valve D has a corresponding annular enlargement or projection, D², at its inner end, which fits snugly in the enlargement or recess E'. In each enlargement or recess E' is a port or passage, g, leading from the atmosphere. The enlargement or recess E' and the enlargement or projection D² on the valve form a dash-pot for cushioning the movement of the valve and preventing any shock from the opening or closing of the valve. The dash being formed upon or integral with the valve itself and the dash-pot formed in the same piece or integral with the seat, the desired end is attained without additional parts and almost without expense, as the cost of construction is only very slightly increased. Where the two valves are connected as here shown the dash-pot of each valve serves to cushion both valves, one being cushioned in opening and the other in closing.

The valve represented in Fig. 3 is intended for a single-acting single-cylinder compressor.

C designates the piston, and E the valve-seat, which in this case is formed by inserting a brass bush in the piston, and has the annular enlargement or recess E' intermediate between its ends instead of at one end, as in Fig. 1. The valve D³ in this instance has its enlargement or annular projection D² between its ends, as clearly shown, and thus I form a double dash-pot which will cushion the valve both in opening and closing.

I am aware that a dash-pot has been made in which a plunger having an annular enlargement is fitted in a cylinder having a corresponding annular enlargement, the upward movement of the plunger being resisted by the vacuum formed below it in its ascent, and the downward movement of the plunger being resisted by air which is trapped in the annular enlargement of the cylinder. This device, however, has no function beyond that of a dash-pot. It does not form a valve, and its plunger is adapted to be connected with a valve by a rod or other connection, whereby the movements of the valve are imparted to the plunger and the valve thereby cushioned.

What I claim as my invention, and desire to secure by Letters Patent, is—

1. The combination, in a pump, of a cylindric valve for controlling the passage of air or other fluid to or from the same, and having an annular enlargement formed integral with it, and a cylindric valve-seat in which said valve fits, and which has an annular enlargement formed integral with it and receiving the annular enlargement of said valve, the annular enlargements of the valve and valve-seat together forming a dash-pot for arresting the movement of the valve in closing, substantially as specified.

2. The combination, in a pump, of two single-acting cylinders and two connected pistons, each having in it a valve-seat and an enlargement or recess therein, two valves fitting said seats, and each having an annular enlargement or projection fitting the enlargement or recess in its seat, and a yoke or connection between said valves, for causing them to work simultaneously, and enabling the dash-pot of each valve to cushion both valves, substantially as specified.

3. The combination of the cylinders A, the connected pistons C, the valves D, the yoke D', connecting said valves, the trunk C', and the spring-actuated saddle d, bearing on said trunk, for supporting the weight of said valves, substantially as specified.

WILLIAM F. GARRISON.

Witnesses:
FREDK. HAYNES,
HENRY T. BROWN.